Feb. 7, 1961
E. R. BEAUFILS ET AL
2,970,404
METHOD OF TREATING TREES AND MEANS FOR
CARRYING OUT THIS METHOD
Filed July 28, 1958
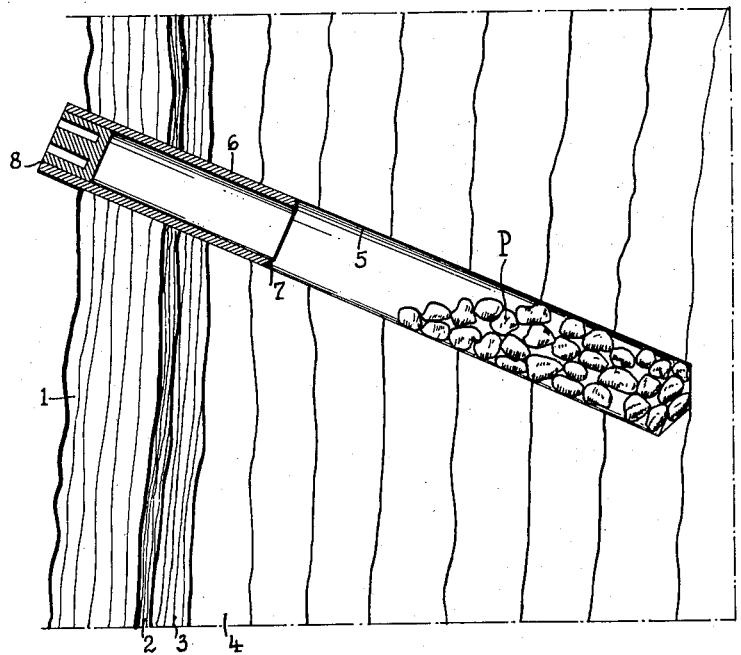
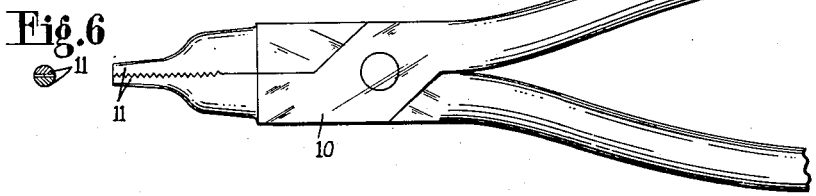
INVENTORS:
EDMOND ROGER BEAUFILS
RENE HENRI COURNUT
By
Richardson, David and Nardon
Arry's.

2,970,404
METHOD OF TREATING TREES AND MEANS FOR CARRYING OUT THIS METHOD

Edmond Roger Beaufils and René Henri Cournut, Paris, France, assignors to L'Union Financiere d'Extreme-Orient, Djibouti (Cote Francaise des Somalis), a French company, and Societe Auxiliaire de l'Institut Francais du Caoutchouc, Paris, France, a French company Filed July 28, 1958, Ser. No. 751,306

Claims priority, application Vietnam Oct. 10, 1957

3 Claims. (Cl. 47—57.5)

The present invention relates to a method of treating trees by injections into the trunk of the tree and to means for carrying out this method.

It is known to treat trees by directly injecting into the trunk substances the tree lacks for optimum development or products intended to combat certain disorders of the tree. To carry out this treatment a hole is formed in the tree at any height and the required products are introduced into this hole after which the latter is plugged. The products thus introduced could consist of liquids, suspensions, gases, powdered or granulated products, or products in tablet form.

With this method, certain difficulties often arise in practice, since there occur infiltrations of products into the sensitive parts of the tree resulting in necrosis, which closes the injection hole formed in the tree and no longer permits repeated injections.

These disadvantages are remedied by the method of the invention.

An object of the invention is to provide a method of treating trees comprising forming in the tree a hole which extends through the sensitive layers of the tree, that is, the bark, the inner bark and the cambium and into the wood proper, inserting a tube having a length greater than the total thickness of said sensitive layers in this hole, the tube being in contact with said sensitive layers, and after introducing the required product into the hole, closing the tube by means of a plug.

Preferably, said tube has a length which only slightly exceeds the total thickness of said sensitive layers of the tree so as to provide a large surface of contact between the mass of the tree and the product or products.

As the hole formed in the tree is much longer than the tube, it is in the part of the hole non-lined by the tube that the products injected into the mass of the tree exert their action.

The advantages of this method are:

(a) The surface of contact between the mass of the tree and the injected products is brought to the maximum, whereby a perfect diffusion of the product is obtained.

(b) The inner bark is perfectly protected against contact with the injected products.

(c) The inner bark, which is cut open when forming the hole, is immediately shielded from the air by the tube which performs the function of an artificial bark and no necrosis can occur around the hole.

(d) The tube is plugged after the operation, which shields the injected products from contact with any foreign body.

(e) Said plug is arranged in such manner that it can only be withdrawn with a special tool which eliminates any risk of theft or tampering.

(f) The tube permits repeating frequently the operation whenever desired in a practical manner, thereby affording a rational exploitation in accordance with periodic checks.

Another object of the invention is to provide means for carrying out said method, which comprise in particular a tube provided with a plug and a tool for inserting and removing said plug. The tube consists of a portion of tube preferably chamfered at one end for facilitating its introduction into the hole, this tube having a diameter and length in proportion with the dimensions of the trunk of the tree to be treated; the plug could be a force fit or screwed in the outer end of the tube. Preferably, the plug is arranged in such manner as to be incapable of being removed without using a special tool; for example, there is provided on its outer transverse face two blind holes permitting taking hold of the plug by means of pliers the two branches or jaws of which are introduced in the two blind holes.

The type of material of which the tube is made is important, for example a metal tube would tend to create a galvanic element in the tree due to contact between the tube and the acid or basic products injected, and the current produced by this element would cause necrosis.

It has been discovered according to the invention that it is advantageous to make this tube from a plastic material, which is chemically neutral, inattackable by atmospheric agents and has sufficient rigidity to permit introduction of the tube into the hole.

Further, the injected products are of different types and sometimes antagonistic, and the different tubes inserted in the same tree must be distinguishable from one another. In this case, the advantage of polyethylene is that it can be coloured throughout its thickness in an indelible manner, which affords a permanent marking.

Further features and advantages of the invention will be apparent from the ensuing description, with reference to the accompanying drawing, to which the invention is in no way restricted.

In the drawings:

Fig. 1 is a sectional view of a portion of a trunk of a tree showing a tube in position for carrying out the method of the invention;

Fig. 2 is an axial sectional view of a tube embodying the invention;

Figs. 3 and 4 are sectional and end views respectively of a plug for the tube shown in Fig. 2;

Fig. 5 is a partial side-elevational view of pliers for extracting the plug; and Fig. 6 is a cross-sectional view of the two branches or jaws of said pliers.

Fig. 1 shows a portion of a tree comprising a bark 1, an inner bark 2 and the cambium 3, these three layers constituting what is hereinafter termed the sensitive layers of the tree. The wood proper 4 could comprise, in the known manner, the young layers, such as the sap-wood, and the old layers constituting the heart.

A hole 5 drilled into this trunk has a downwardly inclined slope and extends through the sensitive layers and rather deeply penetrates the wood. This hole could be formed at any height between the roots and the branches. Inserted in this hole is a tube 6 of plastic material, preferably polyethylene, chamfered at its end at 7. The length of the tube is such that the tube extends definitely through the sensitive layers and fairly deeply penetrates the wood.

The tube has such diameter that it enters perfectly with a slight force in the hole formed in the tree. The outer face or wall of the tube could be smoothed or fluted or provided with a screwthread permitting it to be screwed into the tree. In the latter case, the outer end of the tube must be arranged to permit use of a screwing tool.

After the tube has been placed in position, a certain amount of products P are introduced therein, these products being in the presently-described embodiment in granulated form, it being understood that they could be in the form of for example tablets, powder or liquid. These products descend or are forced to the bottom of the hole.

The tube is thereafter closed by a plug 8 (see Figs. 3 and 4) which is forced inwardly until the outer transverse face of the plug is flush with the outer end of the tube. The plug could have a smooth outer face and be fitted in the tube or could have a screwthread and be screwed in the tube in which case the latter is tapped in its outer end. The plug comprises two blind holes 9, 9 and may be withdrawn by means of pliers 10, such as the pliers shown in Figs. 5 and 6 which have two branches or jaws 11, 11 capable of being engaged in the holes 9, 9 for extracting the plug by traction or unscrewing.

Preferably the plug is also composed of plastic material.

The diameter of the tube is calculated as a function of the nature of the products injected (tablets, or granulated, powdered or liquid products) and also of the dimensions of the trunk to be treated. In certain cases it could be reduced to the dimension of a simple hollow needle.

The tube could be permanently placed in position. In this case it constitutes a permanent element which permits repeated injections without the products entering into contact with the sensitive parts of the tree while providing a large surface of diffusion of the product.

The plug could be withdrawn by means of a special tool which eliminates any risk of theft or tampering.

The method and means of the invention are of particular use in the treating of heveas, but it could also be applied to any other vegetable species and notably fruit trees.

Although a specific embodiment of the invention has been described, many modifications and changes may be made therein without departing from the scope of the invention as defined in the appended claims.

Having now described my invention what I claim as new and desire to secure by Letters Patent is:

1. Means of use in the treatment of trees, which treatment is effected by disposing the treating product in an aperture which is formed in the tree and extends through the sensitive layers of the tree, that is, the bark, the inner bark and the cambium, and into the wood proper of the tree, said means comprising a rigid plastic tube which is adapted to closely fit in said aperture and has a length less than the length of said aperture but greater than the total thickness of said sensitive layers, and a substantially cylindrical plastic plug for closing the outer end of the tube relative to the tree, whereby said sensitive layers are shielded from contact with said product and the surrounding air, the plug being engageable in the tube so as to be flush with said outer end, and two recesses being formed in the outer end of the plug relative to the tube, said two recesses permitting engagement therein of a plug-removing device.

2. Method of treating trees with treating products comprising the steps of: forming in the trees a bore which is downwardly inclined inwardly of the trees through the sensitive layers of the tree, that is, the bark, the inner bark and the cambium and into the wood proper, inserting into this bore a rigid tube made of plastic material which is chemically neutral and inattackable by atmospheric agents and by the sap of the tree, said tube having a length greater than the total thickness of said sensitive layers and such cross-sectional size that the tube is in contact with said sensitive layers, introducing the required treating products into the tube, closing the outer end of the tube relative to the tree by means of a plug and leaving this tube and plug in the bore whereby the sensitive layers are protected from the contact of the said treating products.

3. Method of treating trees with treating products comprising steps of: forming in the trees a bore which is downwardly inclined inwardly of the trees and extends substantially radially through the sensitive layers of the tree, that is, the bark, the inner bark and the cambium and into the wood proper, inserting into this bore a rigid tube made of plastic material which is chemically neutral and inattackable by atmospheric agents and by the sap of the tree, said tube having a length greater than the total thickness of said sensitive layers and such cross-sectional size that the tube is in contact with said sensitive layers, introducing the required treating products into the tube, closing the outer end of the tube relative to the tree by means of a plug and leaving this tube and plug in the bore whereby the sensitive layers are protected from the contact of the said treating products.

References Cited in the file of this patent

UNITED STATES PATENTS

| | | |
|---|---|---|
| 837,408 | Johnstone | Dec. 4, 1906 |
| 1,682,760 | Laffin | Sept. 4, 1928 |
| 1,805,550 | Lipman | May 19, 1931 |
| 1,999,458 | Hollister | Apr. 30, 1935 |
| 2,712,202 | Hosler | July 5, 1955 |

FOREIGN PATENTS

| | | |
|---|---|---|
| 891,350 | France | Dec. 11, 1943 |
| 188,456 | Germany | Sept. 10, 1907 |
| 8,625 | Great Britain | of 1897 |

OTHER REFERENCES

Bennett: "Treatment of Lime-Induced Chlorosis with Iron Salts," published March 1931 by University of California Agricultural Experiment Station (Berkeley, Calif.) as their Circular 321. Twelve pages in all. Pages 7 through 10 are relied on.

Condensed Chemical Dictionary, published 1956 by Reinhold (N.Y.), Fifth edition, pages 879 and 880 are relied on.

Breen: "A Report on Experiments Using Plastic Tubing to Gather Maple Tree Sap," published July 1, 1957, by Minnesota Mining and Manufacturing Co. (Irvington 11, N.J.). Six pages, all relied on.